(12) United States Patent
Peaschek

(10) Patent No.: US 6,269,584 B1
(45) Date of Patent: Aug. 7, 2001

(54) FISHING ROD HOLDER

(76) Inventor: David Peaschek, 324 Essex Ave., Marmora, NJ (US) 08223

( * ) Notice: Subject to any disclaimer, the term of this patent is extended or adjusted under 35 U.S.C. 154(b) by 0 days.

(21) Appl. No.: 09/388,625

(22) Filed: Sep. 2, 1999

(51) Int. Cl.[7] ................................................ A01K 97/10
(52) U.S. Cl. .............................................................. 43/21.2
(58) Field of Search ............................. 43/21.2; D22/147; 211/70.8; 248/511, 514, 534, 538

(56) References Cited

U.S. PATENT DOCUMENTS

| | | | |
|---|---|---|---|
| 2,200,183 | * | 5/1940 | Legg . |
| 2,626,770 | * | 1/1953 | Norman . |
| 2,682,127 | * | 6/1954 | Binder . |
| 2,890,847 | * | 6/1959 | Minton . |
| 2,954,909 | * | 10/1960 | Miller et al. . |
| 3,376,614 | * | 4/1968 | Stahl . |
| 3,802,112 | | 4/1974 | Banner .................................. 43/21.2 |
| 3,802,652 | * | 4/1974 | Holton, Jr. ............................ 248/534 |
| 4,468,878 | | 9/1984 | Maher ..................................... 43/21.2 |
| 4,546,566 | * | 10/1985 | Corrente ................................ 43/21.2 |
| 4,586,688 | * | 5/1986 | Hartman et al. ...................... 248/538 |
| 4,730,408 | * | 3/1988 | Miller ...................................... 43/15 |
| 4,841,660 | * | 6/1989 | James .................................... 43/21.2 |
| 4,845,881 | * | 7/1989 | Ward ..................................... 43/21.2 |
| 4,856,220 | * | 8/1989 | Oak ....................................... 43/21.2 |
| 4,897,952 | * | 2/1990 | Hawie ................................... 43/21.2 |
| 5,446,989 | | 9/1995 | Stange et al. ......................... 43/21.2 |
| 5,979,102 | * | 11/1999 | Sagryn ................................... 43/21.2 |

* cited by examiner

Primary Examiner—Kurt Rowan
(74) Attorney, Agent, or Firm—Patent & Trademark Services; Thomas Zack; Joseph H. McGlynn

(57) ABSTRACT

A fishing rod holder mountable to a fishing vessel. The holder is supported above the vessel's deck by a conventional adjustable ball joint mount. The holder has a hollow interior cavity with an opening extending along one side and to a communicating front end opening in the holder. Oppositely directed concave surfaces in the front end opening and in an internal movable cradle act to lock an inserted fishing rod in place within the holder as tension is applied to a taut fishing line. The cradle may be positioned and fixed in a depressed or elevated position within the holder. Two side push buttons are used to operate locking mechanisms employed to lock the movable cradle in position. A external side lever fixed to an internal rod is used to move an attached cradle support rod in a pivotal motion. Additional features include a non skid surface around the fishing rod holder surface forming the front end opening to insure the inserted fishing rod will not move when its line is tensioned by a caught fish. When properly inserted into the holder, the fishing rod may be locked in place relative to the vessel to which attached thus, freeing the use of the hands of the user for other operations.

3 Claims, 4 Drawing Sheets

FISHING ROD HOLDER

BACKGROUND OF THE INVENTION

This invention relates to a fishing rod holder in general and to such a holder, in particular, used in a trolling fishing boat.

Fishing rod holders are known. In many cases these holders are used to retain the supported fishing rod in a desired position while the fisherman is busy doing something else with their hands, such as, changing a lure, baiting a hook, unhooking a caught fish, etc. These fishing rod holders may include a rod receiving sleeve that is pivotally mounted on a support surface. In other rod holders, the pivotally mounted holder may be adjusted to various angular orientations and locked in place. Another invention discloses a rod holder mounted by a bracket to the hull of a fishing vessel to hold the rod in a fixed position until a catch is made. Still another fishing rod holder invention has a slot opening with deformable material and a removable retaining strap covering part of the slot opening.

The present invention is directed to a fishing rod holder, specifically designed for use with a trolling vessel, which will automatically pull the placed fishing rod until firmly seated in the holder all as will be described in detail hereafter.

DESCRIPTION OF THE PRIOR ART

Devices that are used to holder fishing rods in position are known. For example, the U.S. Pat. No. 2,954,909 to Miller et al discloses a rod receiving sleeve that is pivotally mounted on a support surface.

U.S. Pat. No. 3,802,112 to Banner discloses a pivotally mounted fishing rod holder that may be adjusted to various angular orientations and locked in place.

U. S. Pat. No. 4,468,878 to Maher discloses an outrigger fishing rod holder mounted by a bracket to the hull of a fishing vessel to hold the rod in a fixed position until a catch is made.

U.S. Pat. No. 5,446,989 to Stange et al. discloses a fishing rod holder invention having a slot opening with deformable material and a removable retaining strap covering part of the slot opening.

SUMMARY OF THE INVENTION

This invention relates to a fishing rod holder mountable to a vessel having an adjustable mount with means for locking and unlocking a fishing rod placed within the holder.

It is the primary object of the present invention to provide for an improved fishing rod holder than can be mounted to a vessel.

Another object is to provide for the quick release of the fishing rod from such a holder.

Still another object is to provide for such a holder wherein the in-place fishing rod may be locked into position within the holder or unlocked therefrom.

These and other objects and advantages of the present invention will become apparent to readers from a consideration of the ensuing description and the accompanying drawings.

DESCRIPTION OF THE PREFERRED EMBODIMENT

Figure 1:
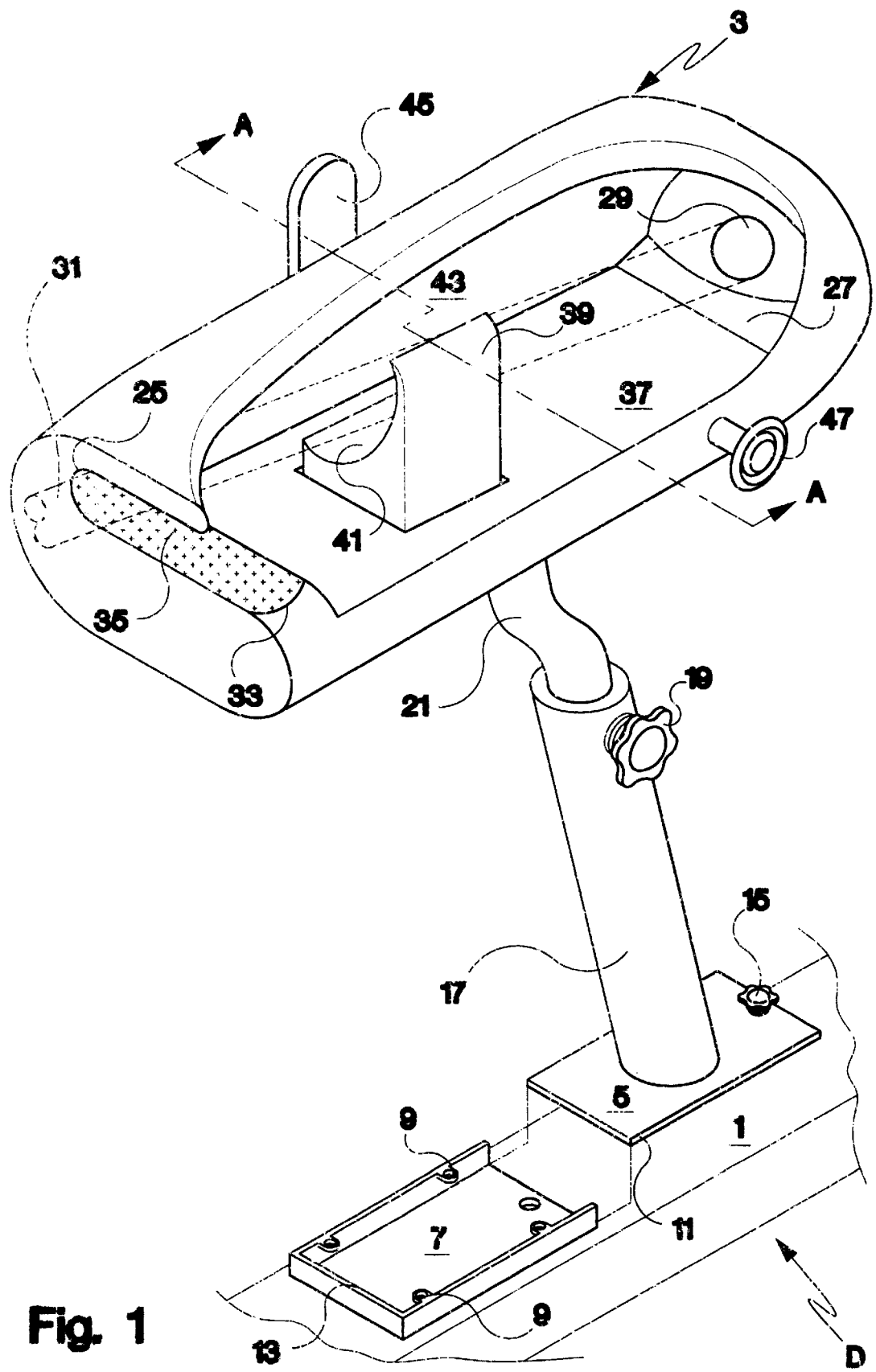
FIG. 1 is a perspective view of the present invention.

FIG. 1 is a perspective view of the present invention showing it about to be mounted on the deck 1 of a ship or vessel traveling in the direction of the arrow D. To mount the fishing rod holder 3 on the deck 1, a lower base plate 5 is slidably received by the base plate holder 7. Several mounting screws 9 on opposite sides of the base plate holder 7 extend through the sides of the holder into the lower deck to fixedly mount the holder 7 to the deck. Both the mating front end 11 of the base 5 and the front end 13 of the holder 7 are narrower than the remaining portions of their respective members to insure a tight sliding fit. Once, the base 5 has been fully slid into the holder 7, such that the two front ends 11 and 13 abut each other, the locking nut 15 with its lower downwardly extending threaded stem (not shown) is rotated to lock the two members 5 and 7 together.

Fixed to the base 5 and extending upwardly therefrom is the rigid support 17. Mounted on the upper end of this support is a joint having the control handle 19. A conventional ball joint (not shown) seats within a cavity in the upper end of support 17 and is attached to the holder engaging extension 21. The upper end of extension 21 having the ball joint lower end is fixedly mounted at its upper end to the undersign of the fishing rod holder 3. With this type of conventional lower support mounting, the holder may be moved to any desired angular relationship with respect to the lower fixed support 17 fixed to the vessel's deck 1. Once moved to the desired angular relationship, the position of the holder 3 relative to the support 17 and deck 1 may be fixed in place by tightening the handle 19.

The fishing rod holder 3 has a hollow interior that is walled on several sides. One side cut out portion 23 of the holder extends substantially the total length of the holder to reveal the holder's interior contents. This cut out portion 23 is opened on the front end 25 and a side of the holder. The remainder of the holder 3 is mostly closed. A rear holder upward ramp 27 within the holder's interior is used to receive the butt end of a inserted handle 29 for the fishing rod 31, partially shown in dotted line format. The front holder concave end surface ramp 33 forming the front wall part of the cut out portion 23 is sized such that its outer non-skid surface 35 forms a progressively narrower opening from the opened side into the interior of the holder. The concave surface 35 forms the seat for the fishing rod handle as the handle is inserted lengthwise from the opened side of the cut out side portion 23. Within the hollow confines of the holder and fixed to its floor 37 is the movable fishing rod cradle 39. The cradle's fishing rod engaging surface 41 is also concaved in the opposite facing direction from front end ramp surface 35. The arrangement of two opposite facing concaved surfaces (33 and 35) allows for the accommodation of different sized or diameter fishing rods inserted into the openings of the holder from the side and front end. When properly seated in the holder, the fishing rod has its handle length bears butt end 29 against the closed back ramp surface 27 with the front part of the handle extending to the holder's front end opening 33. At the same time the cradle surface 41 and the formed non-skid bight of the front end ramp surface 35 each engage the surface of the fishing rod handle at different spaced locations along its length.

As described in more detail hereafter, the cradle 39 may be raised and lowered in a cavity in the holder's floor 37 to vary the degree its concaved curved rod engaging surface 41 engages the handle's side of the inserted fishing rod. When the handle is engaged by the cradle surface 41, the properly inserted fishing rod 31 can be locked in place with respect to the holder 3. Side lever handle 45, partially shown, locks the cradle and fishing rod in place with respect to each other when depressed in the direction of the arrow. A button 77 (see FIG. 4) is used to lock the cradle in the up position. As detailed hereafter, a side release button 47 on the side of the holder 3 is pushed to release the extended cradle 39 from engagement with the insert fishing rod to permit a user to remove the rod from the holder.

As stated, the in-place fishing rod bears against both the front ramp surface 35 and the cradle surface 41 as the vessel trolls. This movement places a slight amount of tension on a fishing rod's taut extended line. When a fish is caught by the line's hook, the user pushes in on knob 47 to unlock the rod from its holder. The open side design of the holder allows for the quick release of the rod from the holder to set the hook in the fish's mouth. The non-illustrated conventional reel portion of the fishing rod 31 would extend outwardly outside of the holder from the cut out portion 23 allowing the drag tension on the reel to be changed while the rod is in the holder should it be desired. It is important to note that the direction the tension is applied to the in-place fishing rod via its fishing line is generally directly opposite to the direction D the vessel is trolling. In this invention, the perpendicularly held fishing rod will not easily be jerked from the holder in the line tensioning process.

Figure 2:
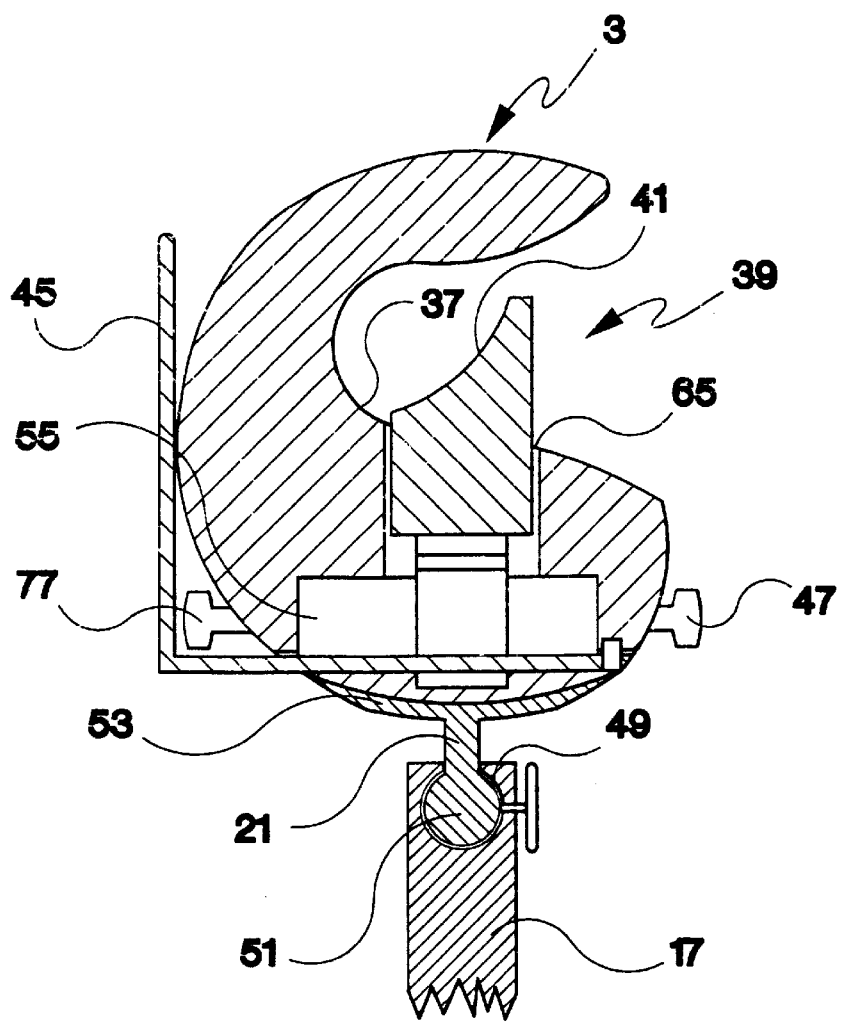
FIG. 2 is a front cross sectional view taken along line A—A of FIG. 1 showing the internal cradle and supporting lower ball joint.

FIG. 2 is a front cross sectional view of the holder showing taken along line A—A of FIG. 1 showing the conventional internal cradle and lower supporting lower ball joint. The linking support between lower holder support 17 and upper member 21 has a ball shaped lower end 51 on member 21 that is received in a rounded upper end opening 49 is used to seat end 51. A small through side hole threadedly receives the threaded stem which extends from and rotates with the external handle 19. When this threaded stem is rotated within its seated hole, a conventional engaged ball cradle C-clamp (not shown) which extends around the diameter of end ball 51, is squeezed tightened such that the clamp frictionally locks the ball 51 to the lower base tubular shaped support 17 in position within spherical opening 49. Until so fixed in position, the end ball extension 21 and attached ball 51 may be rotated within the seat 49 to orient the supported holder in a great variety of different angular positions relative to the lower fixed support 17. A holder base plate 53 (see FIG. 5) is fixed to the underside of the holder 3 to cover the holder's bottom.

Figure 3:
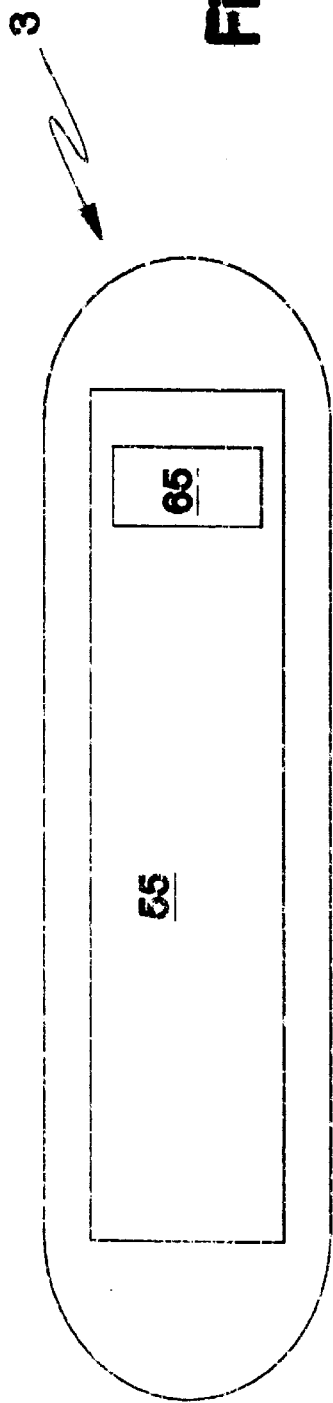
FIG. 3 is a bottom view of the holder.

Within the hollow interior of holder 3 are several interrelated cut out holes. FIG. 3 is a bottom view of the holder 3 by itself without any of the internal working mechanisms used to control the holding or release of the cradle that engages the fishing rod. The rectangular shaped cut out 55 extends part way into the bottom surface of holder 3 (see also FIG. 2). Above and within the cut out 55 is the smaller rectangular cut out hole 65 that extends completely through the holder's floor surface 37 into the cavity forming the hollow rod holder. The hole 65 is used to receive the vertically movable cradle 39 (not shown here).

Figure 4:
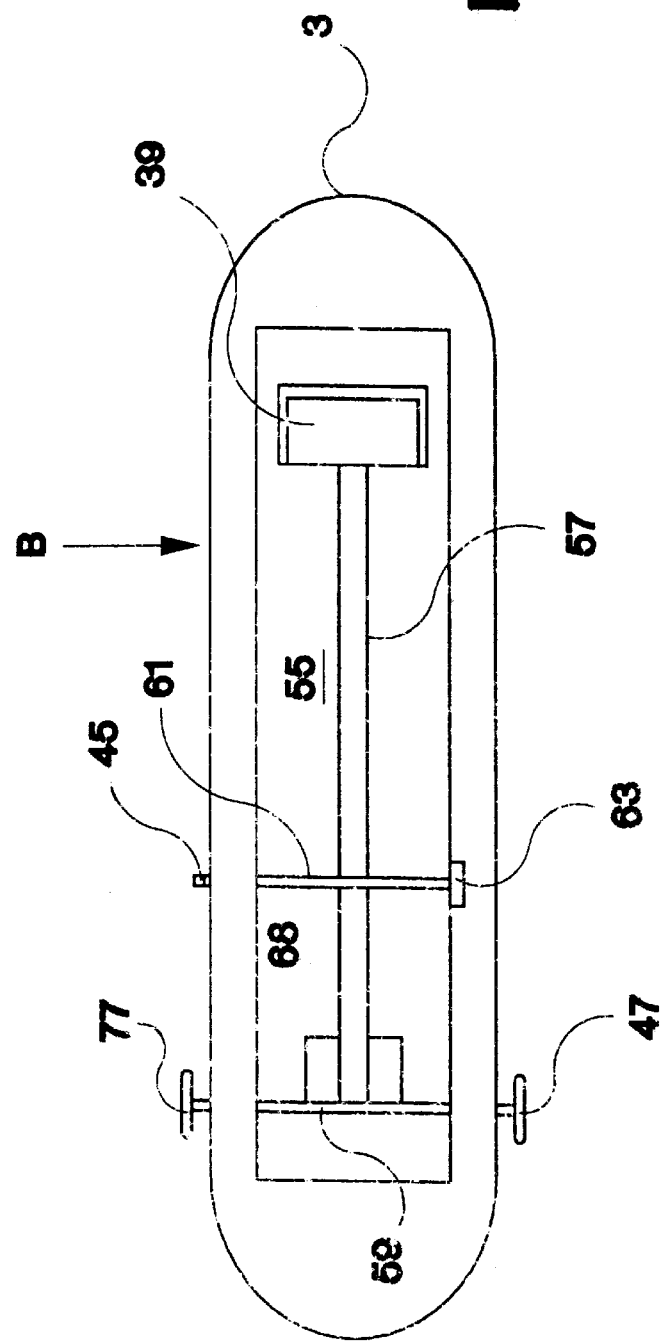
FIG. 4 is a bottom view showing the holder of FIG. 3 with added control mechanisms.

FIG. 4 shows FIG. 3 with the added control mechanisms for the movable cradle. The cradle 39 has an elongated rod 57 fixed by a hinge joint to one of its sides. The rod 57 is attached to an intersecting rod 59 whose rotation is controlled by the button 77. Between the ends of rod 57 is the second intersecting rod 61. One end of rod 61 has a cotter pin or "c" clip 63 to retain the rod 61 within a formed internal cavity in the body of the holder 3. The opposite end of rod 61 has the lever 45 fixed to it to allow for the rotation of the rod 61 when this lever is depressed. When this happens, rod 61 fixed to rod 57 pivots or tilts rod 57, as described with respect to FIG. 6, to allow for the locking of the attached end cradle 39. A lower spring 68 bias the rod 57 at the end opposite the cradle to an elevated position. A fishing rod is retained in place by the elevated cradle 39 when the lever 45 is depressed in the direction of the arrow shown in FIG. 1.

Figure 5:
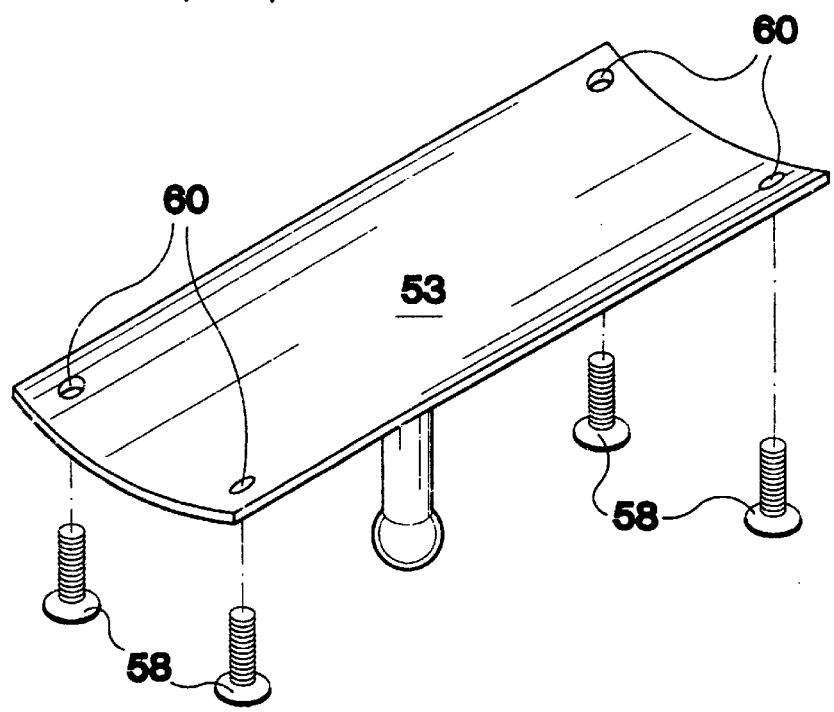
FIG. 5 is a perspective view of the holder's bottom cover plate.

FIG. 5 is a perspective view of the holder's bottom cover plate 53 that can be attached over the holder's lower cut out portion 55 to close this bottom opening. Four corner screws 58 each extend through a corner hole 60 in the cover plate 53 to engage the four holes (not shown) located around and in the holder 3 just outside of the four corners of cut out portion 55.

Figure 6:
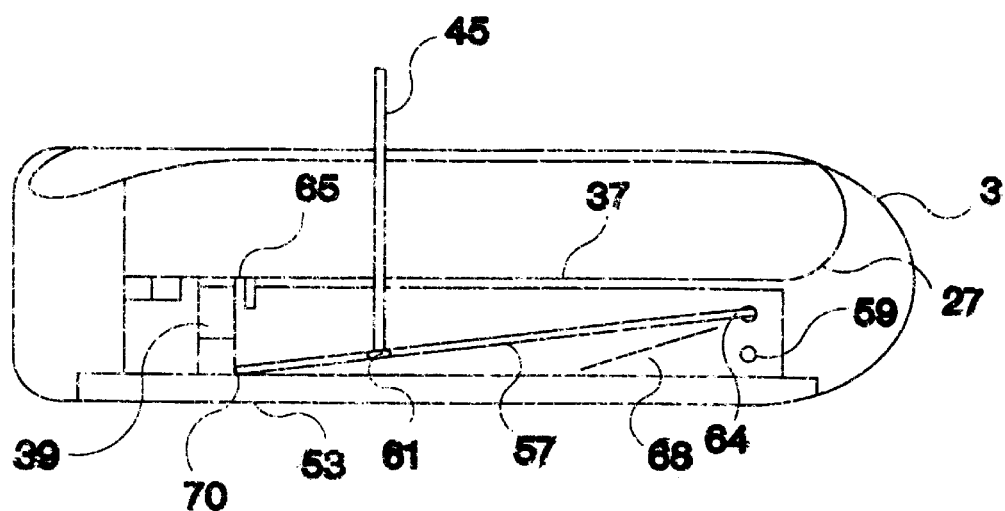
FIG. 6 is a schematic side view of the holder showing the internal cradle working mechanisms of FIG. 4.

FIG. 6 is a schematic side view of the holder as view in the direction of the arrow B of FIG. 4 showing the internal working mechanisms of the holder 3. When the cradle 39 is raised through holder floor hole 65, the upper rod section 64 of rod 57 passes below rod 59 through a center cut out portion 66 (see FIG. 4) in rod 59. When handle 45 is depressed, rod 59 can be slide to the left in FIG. 6 (the right in FIG. 4) by pushing down on external knob 77. This action locks the raised cradle 39 in an elevated (dotted line) position. A hinge 70 joints the lower end section 66 of rod 57 to the cradle 39 while the pivot point where rod 61 is fixed to rod 57 allows for a teeter tooter type of rod 57 motion by lever 45. To release the cradle retained fishing rod, a user pushes on external handle 47 which then moves rod 59. A lower spring 68 normally biases the rod section 64 upwardly which then lowers the opposite cradle end of rod 57 to the lower withdrawn position shown.

Figure 7:
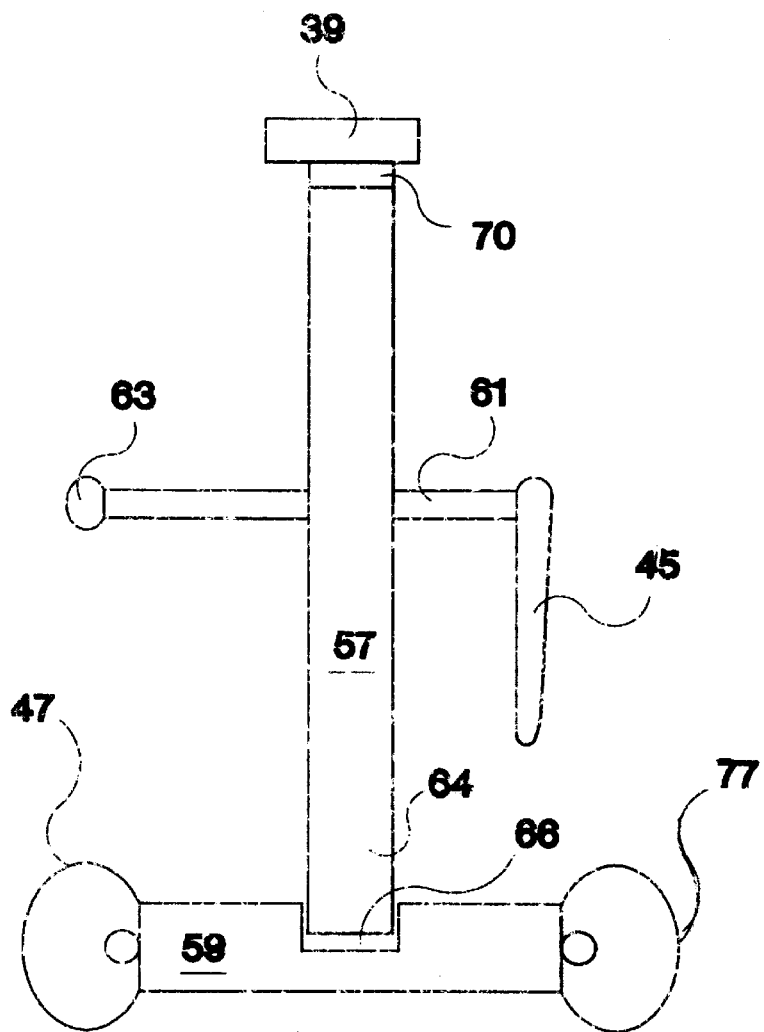
FIG. 7 is a schematic top view showing how the side release button unlocks and locks the end retained cradle in position.

FIG. 7 is a schematic top view of the cradle control mechanism and shows how the previously described side release button 47 unlocks the elevated cradle. In FIG. 7 the lever handle 45 is shown attached to rigid rod 61 which forms the pivot for the intersecting rod 57. In this view the center cut out portion 66 of rod 59 is shown in a somewhat enlarged state. The cut out portion 66 which permits the spring (68) biased end rod section 64 to rise above the intersecting rod 59 when the cut out is aligned with the end of section 64. The opposite end of rod 57 hinge joint 70 joining the end of rod 57 to the cradle 39 is also visible in this view.

Clearly the front end holder openings 33 can be either on the right or left side as desired. In addition other conventional mechanisms may be used to mount the holder to the deck of a vessel.

Although the preferred embodiment of the present invention and the method of using the same has been described in the foregoing specification with considerable detail, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A fishing rod holder mountable on a fishing vessel comprising:
   a support for supporting a fishing rod holder above the deck of a vessel;
   a fishing rod holder adjustably attached to said support, said fishing rod holder having a length with a hollow interior cavity extending along the length of the holder,
   a side fishing rod receiving opening in the holder extending along the length of the hollow interior cavity,
   said fishing rod holder having a front end with a front end opening, said side fishing rod receiving opening extending to said fishing rod holder front end opening to permit the receiving of an insertable fishing rod handle within the hollow interior of the holder, said holder front end opening extending from the outside surface of the holder into the hollow interior of the holder and becoming narrower as the opening extends into the holder;
   means within the hollow interior of the holder for locking an inserted fishing rod handle in place within the holder, said means including a movable cradle having a concaved fishing rod engaging surface and a fishing rod handle bearing surface in the front end opening of the holder;
   said bearing surface in the front end opening of the holder having a surface formed with a non skid outer surface extending around the front end opening; and
   said cradle being movable vertically within the hollow interior of the holder, said cradle being movable from a lowered to an elevated position through an opening formed in a floor surface in the hollow interior of the holder by a plurality of rods.

2. The fishing rod holder as claimed in claim 1, wherein said plurality of rods includes a first rod attached to the movable cradle at a first end, said first rod having a free second end opposite said first end, said first rod being joined to an intersecting second rod between said rod's first end and second end to allow for the pivotal motion of said first rod with respect to the second rod,
   a third rod generally parallel to said second rod and journalled at the ends to the holder, said third rod having a cut out portion which when said portion engages the second end of the first rod to permit the first rod and the cradle to be moved downwardly.

3. The fishing rod holder as claimed in claim 2, wherein said first rod is attached to the movable cradle at a first end by a hinged joint and has its free second end normally biased upwardly against said third rod.

* * * * *